July 25, 1939.  O. MICHALK  2,167,181
HAMMERING ROLLER WITH BALLS
Filed Sept. 21, 1937
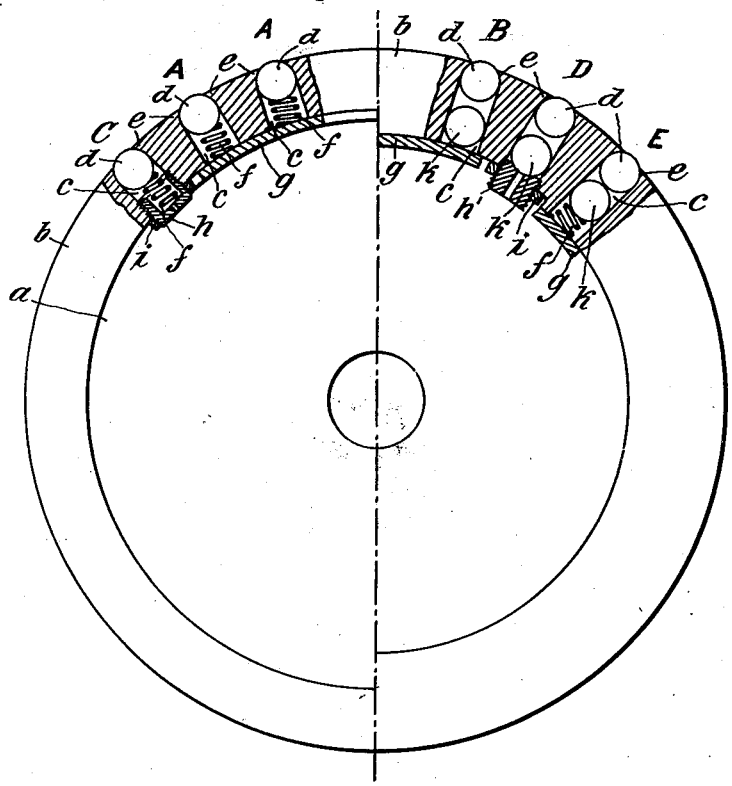
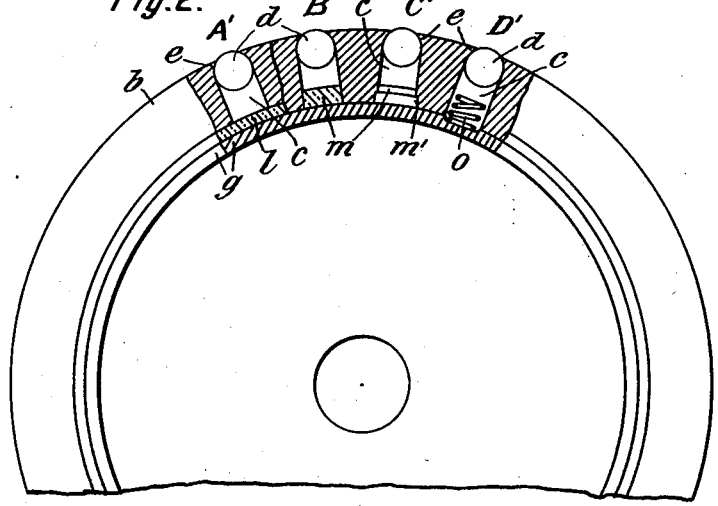
Inventor
OTTO MICHALK
BY Cratrin + Company ATTYS.

Patented July 25, 1939

2,167,181

UNITED STATES PATENT OFFICE 2,167,181

HAMMERING ROLLER WITH BALLS

Otto Michalk, Dresden, Germany

Application September 21, 1937, Serial No. 164,935
In Germany November 12, 1936

1 Claim. (Cl. 12—51)

Hammering rollers having balls guided radially in the rim of the roller operate, as a rule, unobjectionably if the leather to be worked is of any of the normal sorts. In such cases the balls may have a comparatively small diameter and the bores through which the balls project outwardly from the guide spaces provided for them in said rim may likewise have a comparatively small diameter so as to prevent the leather pressed against the said rim from finding access into said spaces and being damaged by the edges of said bores. The diameter of the balls amounts, as a rule, from 9 to 10 mm., and that of the said bores to from 7 to 8 mm.

As regards, however, certain heavy sorts of leather, experience has shown that the hammering action of the balls is somewhat slight which entails the necessity to extend the time of action of the balls. In order to increase the hammering action of the balls it might seem to be sufficient to increase the diameter of the same, say, to about from 12 to 13 mm., but as the balls, i. e. the operating calottes thereof, must have a certain height, the bores in the rim, at the outer ends of the guide spaces, would have to be enlarged correspondingly whereby again the danger of damaging the leather would be established.

Another point to be paid attention to is that when the leather of the boot or shoe to be worked is pressed against the roller the balls are pressed backwardly so forcibly that they push with a very great impetus upon the inner abutment member whereby it causes a likewise very strong recoil, i. e. in outward direction. The recoil is sometimes so strong that the annular inner projections at the contracted outer ends of the guide spaces in the rim of the roller, in which spaces the balls reciprocate, are broken after a certain time so that the balls are flung outwardly. If there are, perhaps, two hammering balls co-operating radially in one guide apace, the impetus of the recoil is often times so strong that the balls are deformed in addition to said angular inner projections at the outer ends of said space, as mentioned in the preceding lines.

The drawbacks from which the known hammering rollers suffer are obviated in the present improved roller, the main characteristic feature of which is that an additional force is provided for the hammering balls and co-operates with them. That feature can be embodied in various constructional forms. The additional force may be, for instance, a spring arranged opposite the inner half of every hammering ball, or another hammering ball (perhaps even more than one) may be provided instead of said spring, and this additional ball may have a larger diameter than the outer ball. In the case of springs their strength can be chosen as best suited for the sort of leather to be worked. The effect is particularly satisfying if one or more additional hammering balls are employed. In either case it is possible to regulate the force of the impetus in order to prevent the above-mentioned annular inner projection at the contracted outer end of the ball guide spaces from being too strongly injured by the balls, especially by reducing the length of the way of the balls in said spaces, as well as by making said way short in comparison to the circumference of the roller. Finally, it is also possible to regulate the distance between the balls and the abutment member at the rear or inner end of the guide space, as well as to regulate the strength of the springs where such are employed.

Disturbances due to the impetus of the balls, or their recoil respectively, are obviated by making the above-mentioned abutment parts of a yielding or an elastic material. The degree of the yieldingness or elasticity may be chosen as best suited in the individual cases; with a very soft or highly elastic material the recoil may be completely obviated.

The invention is illustrated diagrammatically and by way of example on the accompanying drawing on which Figure 1 is chiefly an end-view of, and partly an axial section through, a hammering roller designed according to this invention, the figure showing two constructional forms (A and C) in its left-hand half and three (B, D and E) in its right-hand half, and Figure 2 is a similar representation showing four more constructional forms (A', B', C' and D') of the invention.

On the drawing, $a$ denotes the hammering roller and $b$ the rim of the same, in which there are numerous radial guide spaces $c$ for the hammering balls $d$. Every space $c$ is contracted at its outer end where there is an inner annular projection $e$ preventing the balls from leaving said spaces. Said projections $e$ determine at the same time the extent with which the balls project above the circumferential surface of the roller, or of the rim $b$ respectively.

In the Example A (Fig. 1) the additional force to which the balls are subjected according to this invention is formed by a spring $f$ which is a helical compression spring contacting at its outer end with the respective ball $d$ and at its inner end with a ring g shoved into the rim from a side thereof. The strength of the action or pressure of the spring depends, of course, upon the strength of the springs themselves.

In the Example B (right-hand half of Fig. 1) an additional ball k is used instead of the above-mentioned spring, this ball being located between the outer ball d and the abutment ring g. The free play of both balls is determined by the intended strength of the hammering action, but also by the intended prevention of an unduly strong action of the balls upon the annulus e so as to obviate fracture of the same.

It nearly suggests itself to regulate the force of the action of the balls etc. upon the leather to be hammered. Such regulation can be effected, for instance, by making the strength of the springs regulable by means of a socket h, as shown in the Example C in the left-hand half of Fig. 1. The circumferential surface of said socket and the opposite part of the wall of the space o are screw-threaded, and on the inwardly projecting portion of the socket is a counternut h by which the socket is secured in its position, after its adjustment and thereby also the adjustment of the spring has been effected.

In the case of the employment of an additional ball, as in the Examples D and E (right-hand half of Fig. 1), the additional ball may have a larger diameter than the front ball, the respective portion of the guide space being then correspondingly enlarged. It is, furthermore, possible to employ more than only one additional ball in order to increase the impetus of the action of the added balls on the front ball which, in turn, acts as an abutment. The number of the balls and their size depends upon the sort of the leather to be worked. In all these cases it is possible to make use of springs in addition to the ball.

Such an example is shown at E (right-hand half of Fig. 1). The inner end of the spring f bears on the ring g which is practically the same member as the ring g in the left-half of the figure. It is also in this case possible to provide an adjustable socket like h in the Example C.

Referring now to Fig. 2, the hammering balls are also in these examples (A', B', C', D') retained by the annuli e which are likewise subject to being fractured by the impetus due to the recoil of the balls. This detrimental action takes place only when the balls have already left the work-piece which they have treated. In order to intercept the recoil so as to prevent said detrimental action a ring l of elastic material may be inserted, as shown in the Example A', this ring being secured in its place by the inner ring g which is practically the same member as g in Fig. 1. The ring l may consist, for instance, of a rubber-fabric or of cord-rubber or the like. Instead of a common ring l serving as abutment member for all balls individual rubber plugs m (Example B') may be used, may be such having a collar, as in the Example C'. The length of the rubber plugs should be determined by the size of the balls and in accordance with the length of the way to be covered by them within the space containing the ball (or balls). Finally, springs, for instance like o (Example D'), may be used instead of the rubber plugs. If two hammering balls are used, any one of the abutment means shown in the Examples A'-D' may be employed.

Owing to the provision of the elastic abutment members the impetus due to the recoil of the balls after these have acted on the work-piece can be completely annihilated.

The strong recoil blow of the balls in outward direction entails also the drawback that the balls often times stick fast in their guide spaces, especially at the contracted portion or annulus e, in consequence whereof the balls are prevented from giving easily way when they contact with the work-piece. Also this drawback can be completely obviated by the present invention.

I claim:

A hammering roller for the manufacture of boots and shoes comprising, a cylindrical casing with radial channels, balls guided in said channels, inward projections on the outer end of said channels to withhold said balls and a second ball behind said first ball for counteracting said balls in their channels substantially as described.

OTTO MICHALK.